US008856653B2

(12) United States Patent
Esaka et al.

(10) Patent No.: US 8,856,653 B2
(45) Date of Patent: Oct. 7, 2014

(54) VIDEO DISPLAY APPARATUS, VIDEO DISPLAY MANAGEMENT APPARATUS, VIDEO DISPLAY METHOD AND VIDEO DISPLAY MANAGEMENT METHOD

(75) Inventors: Naoki Esaka, Tachikawa (JP); Mieko Onodera, Kawasaki (JP); Sachie Yokoyama, Ome (JP); Munehiro Tokikura, Kawasaki (JP); Ayako Kanai, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 118 days.

(21) Appl. No.: 13/402,553

(22) Filed: Feb. 22, 2012

(65) Prior Publication Data

US 2012/0278718 A1 Nov. 1, 2012

(30) Foreign Application Priority Data

Apr. 27, 2011 (JP) ................. 2011-099747

(51) Int. Cl.
G06F 3/00 (2006.01)
G06F 17/30 (2006.01)

(52) U.S. Cl.
CPC .............. *G06F 17/30899* (2013.01)
USPC ............ 715/719; 715/760; 715/781

(58) Field of Classification Search
USPC ................ 715/719, 760, 791, 781
See application file for complete search history.

(56) References Cited

U.S. PATENT DOCUMENTS

2006/0242145 A1* 10/2006 Krishnamurthy et al. ........ 707/6
2006/0277460 A1* 12/2006 Forstall et al. ................ 715/513
2008/0307301 A1* 12/2008 Decker et al. ................ 715/241
2009/0265420 A1* 10/2009 Hansen et al. ................ 709/203
2010/0067052 A1 3/2010 Iwasaki
2012/0079365 A1 3/2012 Yoshida

FOREIGN PATENT DOCUMENTS

| JP | 2002-007404 | 1/2002 |
|---|---|---|
| JP | 2002-132832 | 5/2002 |
| JP | 2006-107458 | 4/2006 |
| JP | 2007-226769 | 9/2007 |
| JP | 2008-117161 | 5/2008 |
| JP | 2008-305104 | 12/2008 |
| JP | 2012-069058 | 4/2012 |

OTHER PUBLICATIONS

Japanese Patent Application No. 2011-099747, First Office Action, mailed Apr. 17, 2012, (with English Translation).

* cited by examiner

*Primary Examiner* — Doon Chow
*Assistant Examiner* — Tam Tran
(74) *Attorney, Agent, or Firm* — Blakely, Sokoloff, Taylor & Zafman LLP

(57) ABSTRACT

According to one embodiment, a video display apparatus includes a selection module, a Web information analysis module, a screen generation module, a transmission module, a reception module, and an alteration module. The selection module is configured to select a partial area of a Web page. The Web information analysis module is configured to analyze first Web information which specifies the partial area. The screen generation module is configured to generate a screen for displaying page information of the partial area, based on the first Web information. The transmission module is configured to transmit the first Web information to an external apparatus.

18 Claims, 12 Drawing Sheets

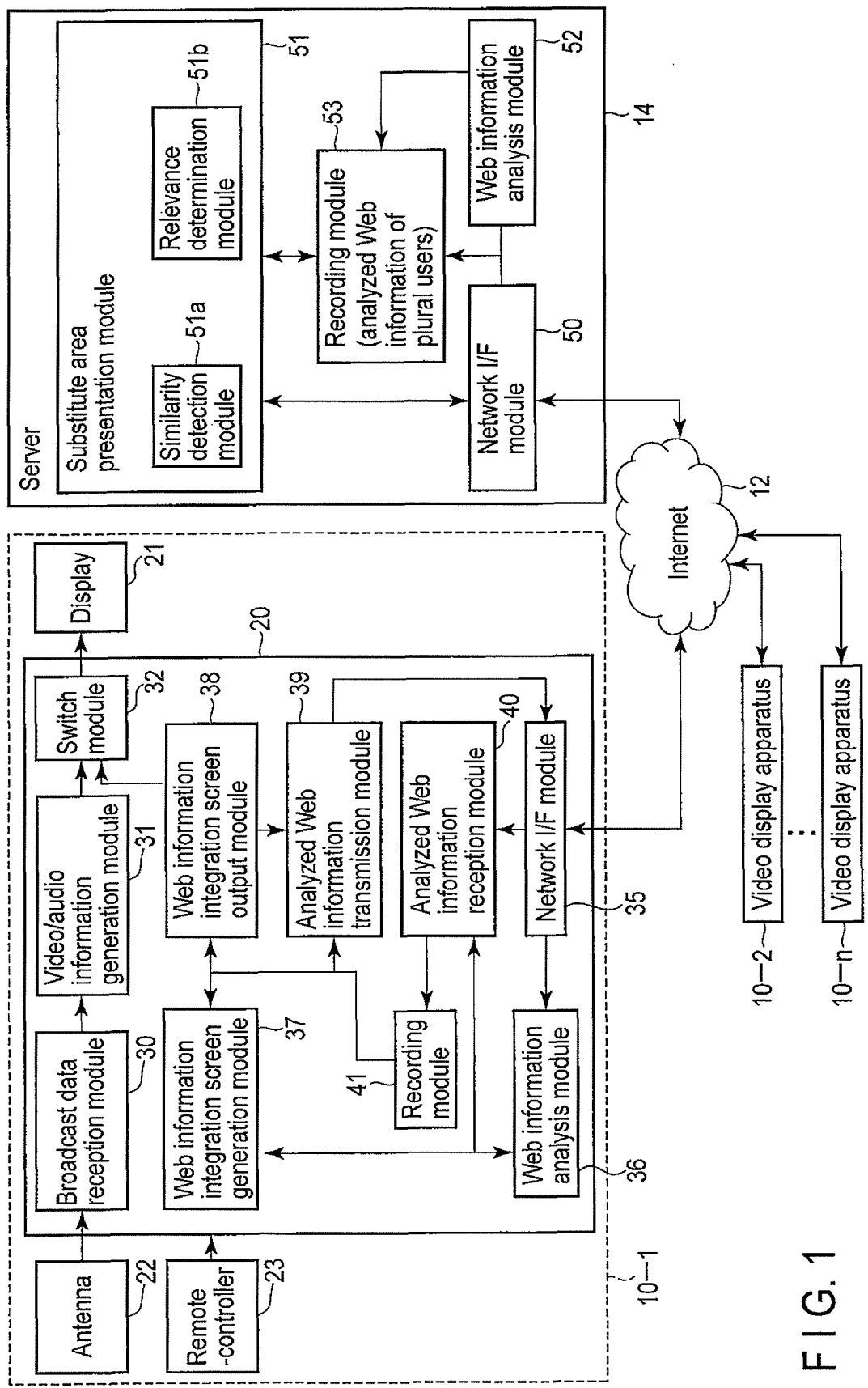
F I G. 1

```
user_A_data = [{
    'id': 'b01',
    'board_data': [{
        'version': 'board1.0.0',
        'design': './TvHome-d01.css',
        'name': 'sports',
```
— A1

```
        'tool': [{
            "url": "http://baseball.example.com/npb/",
            "id": "Tool1301531114028_102Base",
            "date": "2011-03-31T00:29:53.050Z",
            "title": "foo!sports-pro baseball",
            "posi_top": 70,
            "posi_left": 100,
```
— A2

```
            "param":[
                "zoom": 1.22,
                "width": 634,
                "height": 232,
                "selector": ["#NpbBoxTeam"],
                "doc_height": 7964,
                "doc_width": 2064,
                "top": 1147,
                "left": 784,
            ],
```
— A3

```
            "BlockVector" = {
                "div":3,
                "table":1,
                "h2":2,
                "text":13
            }
```
— A4

— A5
— A6
— A7

```
    'id':'b02',
    'board_data': [{
        'version': 'board1.0.0',
        'design':'./TvHome-d01.css',
        'title':'Default',
        'tool': [{
            'url':'http://weather.example.org/weather/',
            'id':'pTool002',
              :
```
— A8

```
              :
```
— A9

F I G. 6

```
user_B_data = [{
  'id': 'b01',
  'board_data': [{
    'version': 'board1.0.0',
    'design': './TvNews.css',
    'name': 'check',
```
— B1

```
    'tool': [{
      "url": "http://weather.foo.example.com/united-states",
      "id": "Tool1301533913244_104Base",
      "date": "2011-03-31T01:12:26.881Z",
      "title": "California Weather Forecasts",
           ⋮
```
— B2

```
      "url": "http://baseball.example.com/npb/",
      "id": "Tool111101310258369_102Base",
      "date": "2011-03-30T23:01:23.051Z",
      "title": "foo!sports-pro baseball",
      "posi_top": 70,
      "posi_left": 100,
```
— B3

```
      "param":[
        "zoom": 1.24,
        "width": 628,
        "height": 214,
        "selector": ["#NpbBoxTeam"],
        "doc_height": 7923,
        "doc_width": 2060,
        "top": 1145,
        "left": 771,
      ],
```
— B4

```
      "BlockVector" = {
        "div":3,
        "table":1,
        "h2":2,
        "text":13
      }
```
— B5

```
<html>
<head>
<title></title>
<head>
<body>

<h1>news</h1>

<div class="news1n">
   <h2>news 1</h2>
</div>

<div class="news2">
   <h2>news 2</h2>
   "some news...
</div>

</body>
</htm1>
```

FIG. 8

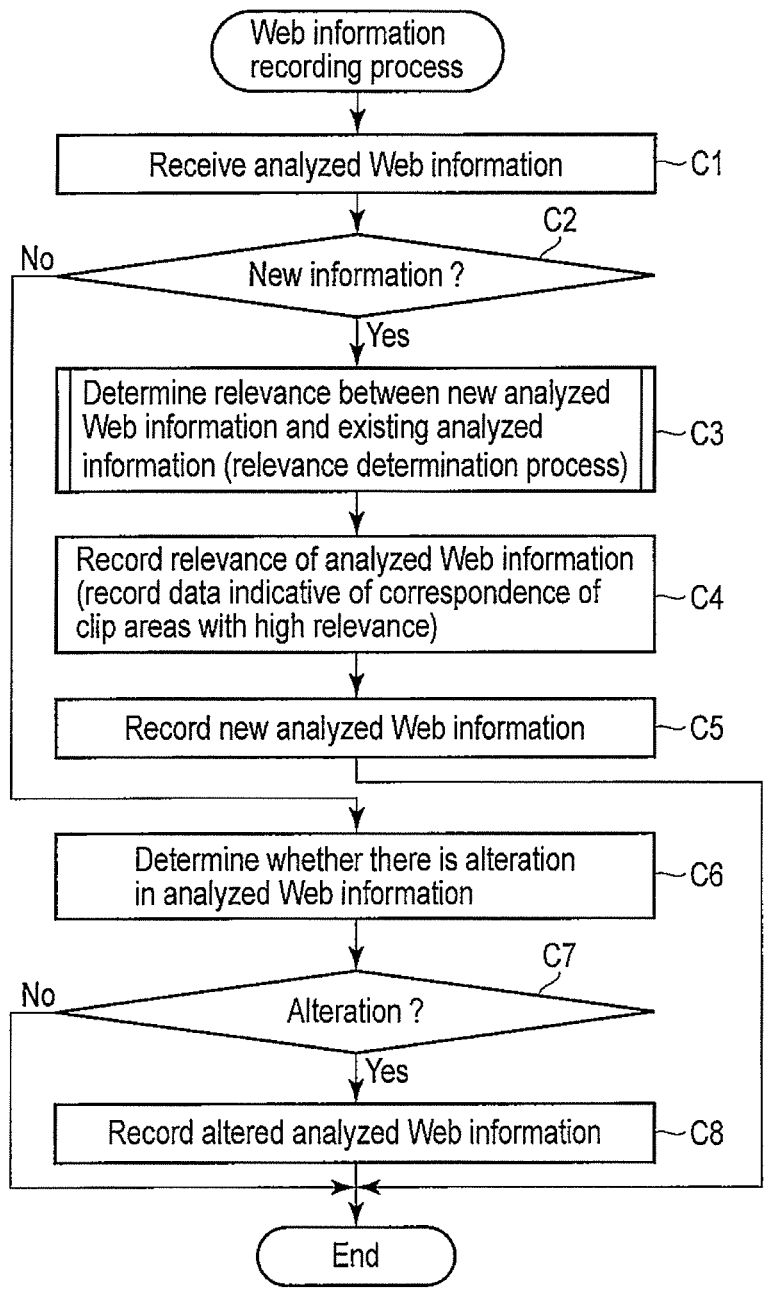
F I G. 9

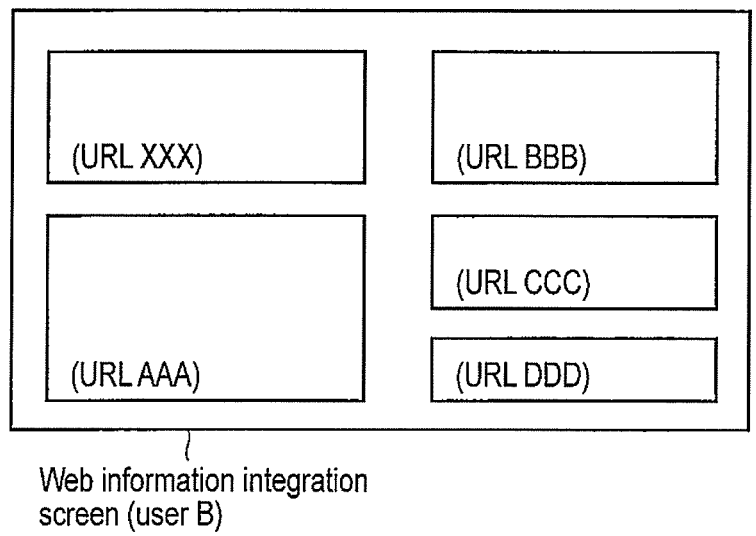
Web information integration screen (user B)
F I G. 1 1
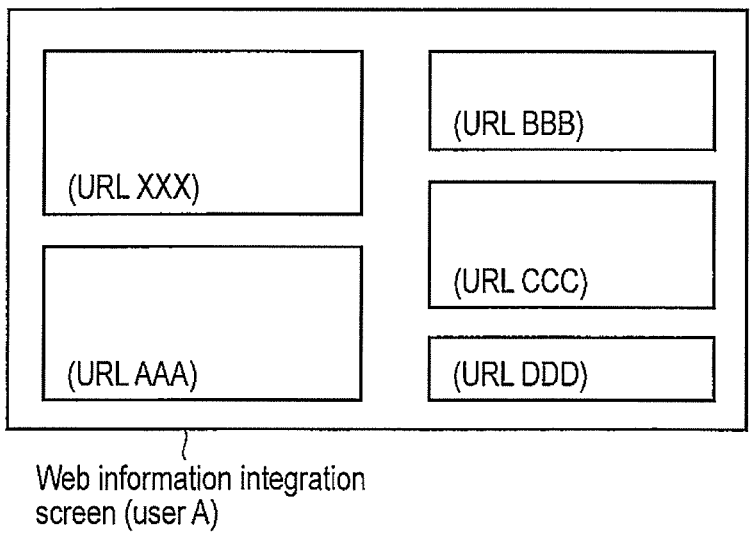
Web information integration screen (user A)
F I G. 1 2 user: "A", id: "b01", tool_id: "Tool1301531114028_102Base",
candidate_area: 1,
candidate_position: 1,
candidate_similarity: 1,
candidate_url: 1 user: "C", id: "xxx", tool_id: "Tool1101310010018_1x1Base",
candidate_area: 0.9,
candidate_position: 0.1,
candidate_similarity: 0.5,
candidate_url: 0.45 user: "B", id: "xxx", tool_id: "Tool1101310258369_1x1Base",
candidate_area: 0.84,
candidate_position: 0.1,
candidate_similarity: 0.9,
candidate_url: 0.9

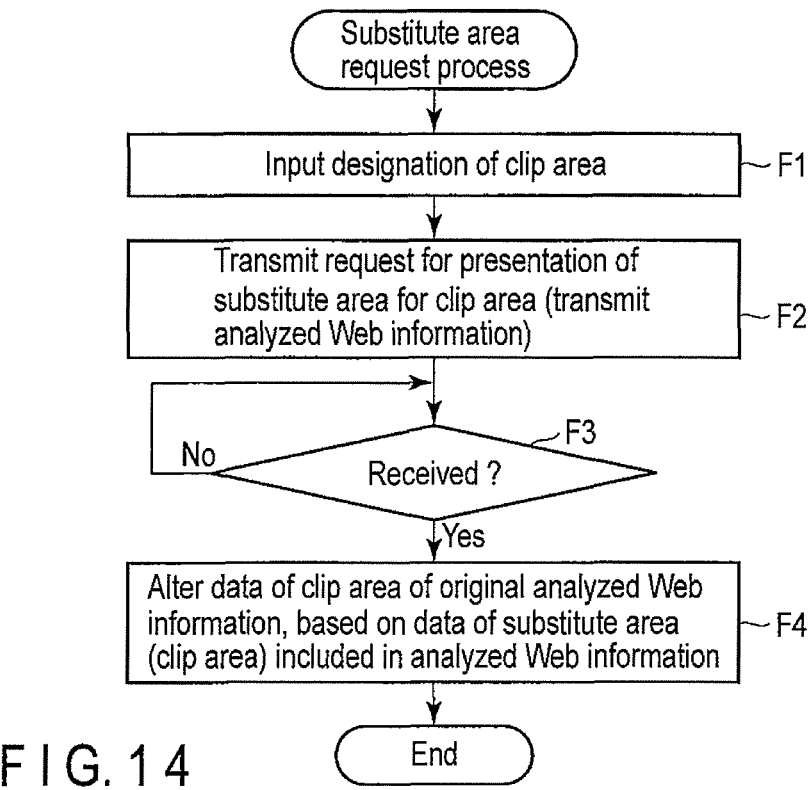
F I G. 14
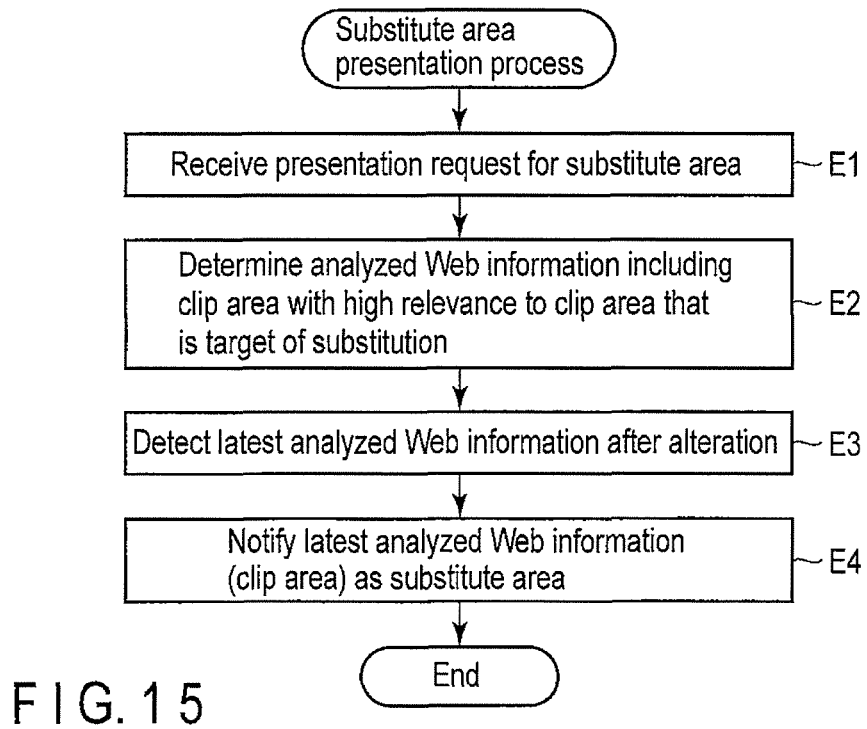
F I G. 15

VIDEO DISPLAY APPARATUS, VIDEO DISPLAY MANAGEMENT APPARATUS, VIDEO DISPLAY METHOD AND VIDEO DISPLAY MANAGEMENT METHOD

CROSS-REFERENCE TO RELATED APPLICATIONS

This application is based upon and claims the benefit of priority from prior Japanese Patent Application No. 2011-099747, filed Apr. 27, 2011, the entire contents of which are incorporated herein by reference.

FIELD

Embodiments described herein relate generally to a video display apparatus for browsing a Web page, a video display management apparatus, a video display method and a video display management method.

BACKGROUND

In recent years, there is known a TV apparatus which is equipped with a Web browser which enables browsing of a Web page that is made public on the Internet. The TV apparatus can access the Web page via the Web browser and can display the Web page.

In addition, in recent years, there is known a technique of clipping only a part of a Web page.

In some cases, the content of a Web page made public on the Internet is irregularly altered. For example, the layout of contents in the page is altered, or the content of the page is altered. In addition, there is a case in which the address (URL (uniform resource locator)) of the Web page is changed and it appeared as if the Web page were lost. Although various modes of clipping can be thought, the clipping in this case refers to a technique of displaying, in enlarged scale, an area of a part (partial area) of a Web page, so that the part of the Web page appears as if it were clipped.

When a partial area that is a target of display is designated in order to clip and display a part of a Web page, if the Web page corresponding to this partial area is altered, an expected content could not be displayed. Consequently, each time the Web page is altered, it becomes necessary to repeat the operation of designating a partial area that is a target of display.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is an exemplary view showing a structure of a video display system according to an embodiment.

FIG. 6 is an exemplary view showing analyzed Web information which is recorded in a server in the embodiment.

FIG. 7 is an exemplary view showing analyzed Web information which is recorded in the server in the embodiment.

FIG. 8 is an exemplary view showing an example of an HTML file in the embodiment.

FIG. 9 is an exemplary flow chart illustrating a Web information recording process by the server in the embodiment.

FIG. 11 is an exemplary view showing a Web information integration screen which is set in a video display apparatus of a user B in the embodiment.

FIG. 12 is an exemplary view showing a Web information integration screen which is set in a video display apparatus of a user A in the embodiment.

FIG. 13 is an exemplary view showing clip areas in an order from a highest relevance, which is determined with respect to clip areas of the Web information integration screen in the embodiment.

FIG. 14 is an exemplary flow chart illustrating a substitute area request process in the video display apparatus in the embodiment.

FIG. 15 is an exemplary flow chart illustrating a substitute area presenting process in the server in the embodiment.

DETAILED DESCRIPTION

Figure 2:
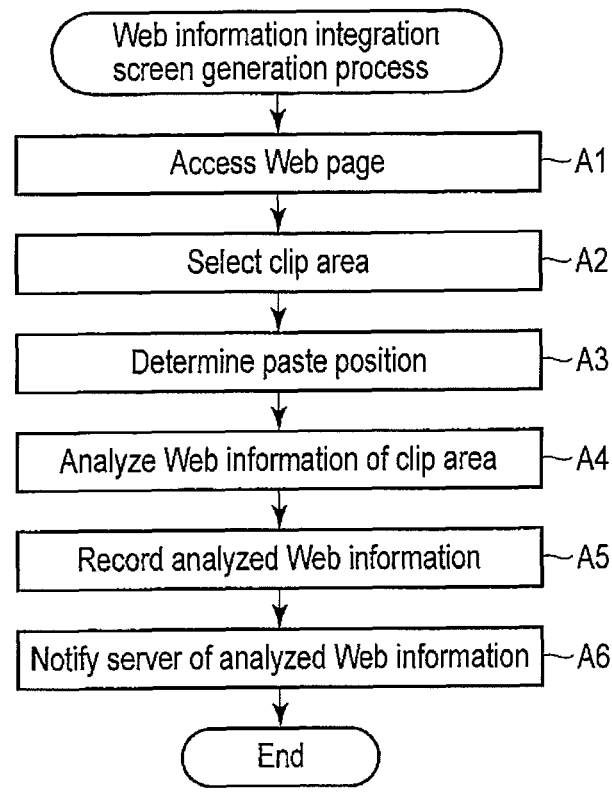
FIG. 2 is an exemplary flow chart illustrating a Web information integration screen generation process by a video display apparatus in the embodiment.

Various embodiments will be described hereinafter with reference to the accompanying drawings.

In general, according to one embodiment, a video display apparatus comprises a selection module, a Web information analysis module, a screen generation module, a transmission module, a reception module, and an alteration module. The selection module is configured to select a partial area of a Web page. The Web information analysis module is configured to analyze first Web information which specifies the partial area. The screen generation module is configured to generate a screen for displaying page information of the partial area, based on the first Web information. The transmission module is configured to transmit the first Web information to an external apparatus. The reception module is configured to receive second Web information having a relevance to the first Web information from the external apparatus. The alteration module is configured to alter the first Web information, based on the second Web information.

FIG. 1 shows an example of the structure of a video display system according to an embodiment. In the video display system shown in FIG. 1, a plurality of video display apparatuses 10 (10-1, 10-2, ..., 10-n) are connected to a server 14 (video display management apparatus) over a network such as the Internet 12. The video display apparatus 10 in the embodiment is realized as, for example, a TV apparatus.

The video display apparatus 10 can receive TV broadcast and output video/audio, and can also receive information, such as a Web page which is made public by a Web site, via the Internet, and display the received information. In addition, the video display apparatus 10 can display not only the entirety of a Web page, but can also display a plurality of Web pages on one screen by integrating them. Furthermore, the video display apparatus 10 can select an area of a part (partial area) of a Web page in accordance with a user operation, and can display Web pages corresponding to partial areas by integrating the Web pages.

The server 14 includes a Web information recording function of receiving and recording, from each video display apparatus 10, Web information (analyzed Web information) which is used in order to display a Web page. In addition, the server 14 includes a substitute area presenting function of transmitting, in response to a substitute area presentation request from the video display apparatus 10, analyzed Web information with a high relevance to analyzed Web information which is received together with the presentation request. The substitute area presentation request is transmitted in accordance with an instruction from a user operation, for example, when a Web page displayed based on Web information in the video display apparatus 10 has failed to be correctly displayed because of an alteration in a Web site (e.g. a change of layout, content, address (URL), etc.). By transmitting substitute analyzed Web information with a high relevance from the server 14 to the video display apparatus 10, the Web page can easily be correctly displayed, without performing, for example, a work of selecting a partial area in the video display apparatus 10.

The video display apparatus 10 can be realized, not only as a TV apparatus, but also as an electronic apparatus having a network connection function and a video display function, such as a personal computer, an HOD recorder, a DVD recorder, a car navigation system, or a mobile phone.

As shown in FIG. 1, the video display apparatus 10-1 includes an apparatus main body 20, a display 21, an antenna 22 and a remote-controller 23.

The apparatus main body 20 includes a broadcast data reception module 30, a video/audio information generation module 31, a switch module 32, a network I/F module 35, a Web information analysis module 36, a Web information integration screen generation module 37, a Web information integration screen output module 38, an analyzed Web information transmission module 39, an analyzed Web information reception module 40 and a recording module 41. The respective module functions, which are realized in the apparatus main body 20, can be realized by executing programs by a processor (CPU). In addition, the respective module functions may be realized by hardware such as a DSP (Digital Signal Processor) or a microcomputer.

The broadcast data reception module 30 and video/audio information generation module 31 are functional modules for outputting TV broadcast. The broadcast data reception module 30 acquires broadcast data (including video information, audio information and EPG (Electronic Program Guide) information) from broadcast waves which are received from the antenna 22, and outputs the broadcast data to the video/audio information generation module 31. The video/audio information generation module 31 generates a video signal, which can be displayed on the display 21, based on the broadcast data received by the broadcast data reception module 30, and also generates an audio signal which can be output from a speaker (not shown).

In accordance with a switching signal which is transmitted from the remote-controller 23 in accordance with a user operation, the switch module 32 effects switching between a TV broadcast output (video, audio), which has been generated by the video/audio information generation module 31, and a Web information integration screen output for Web page browsing, which is output from the Web information integration screen output module 38.

The functional modules, other than the broadcast data reception module 30 and video/audio information generation module 31, are functional modules for displaying a Web page which is acquired via the Internet 12.

The network I/F module 35 is an interface for transmitting/receiving data to/from an external apparatus (e.g. server 14, Web server, etc.) via the Internet 12. The network I/F module 35 acquires a Web page (Web information (e.g. HTML (Hyper Text Markup Language) file) which defines the structure of a page) from a Web site (not shown) which is opened on the Internet 12. In addition, the network I/F module 35 transmits/receives analyzed Web information (to be described later) to/from the server 14.

When display of a Web page (Web information integration screen) is requested from the remote-controller 23 in accordance with the user operation, the Web information analysis module 36 analyzes the Web information which is acquired by the network I/F module 35, and outputs the analysis result to the Web information integration screen generation module 37. In the case of displaying a Web information integration screen for displaying a plurality of Web pages on one screen, the Web information analysis module 36 acquires and analyzes Web information of Web pages which are to be displayed on the Web information integration screen, based on analyzed Web information which is recorded in the recording module 41.

The Web information integration screen generation module 37 includes a Web information integration screen generation function. In accordance with an instruction from the user, the Web information integration screen generation module 37 executes a Web information integration screen generation process, and generates analyzed Web information which defines a Web information integration screen and records the analyzed Web information in the recording module 41. The analyzed Web information, which is recorded in the recording module 41, is transmitted to the server 14 by the analyzed Web information transmission module 39. The analyzed Web information includes information for displaying, on the Web information integration screen, page information (content) of a partial area (clip area) which is selected from at least one Web page. When display of a Web page (Web information integration screen) is requested from the remote-controller 23 in accordance with the user operation, the Web information integration screen generation module 37 integrates analysis results by the Web information analysis module 36, based on the analyzed Web information, and generates a Web information integration screen (see FIG. 4). On the Web information integration screen, the page information of the partial area selected from the Web page is displayed such that the page information is enlarged/reduced in accordance with a paste position (area) which is determined in the screen.

The Web information integration screen output module 38 outputs the Web information integration screen, which has been generated by the Web information integration screen generation module 37, to the display 21 via the switch module 32.

The analyzed Web information transmission module 39 transmits the analyzed Web information, which has been generated by the Web information integration screen generation module 37, to the server 14 via the network I/F module 35. When a presentation request for presenting a substitute area has been instructed from the remote-controller 23 by the user operation, the analyzed Web information transmission module 39 transmits, to the server 14, the presentation request for a substitute area, together with the analyzed Web information that is the target of the substitute are presentation request.

The analyzed Web information reception module 40 receives analyzed Web information, which is a substitute candidate that is transmitted from the server 14 in response to the presentation request for a substitute area which has been transmitted from the analyzed Web information transmission module 39. Analyzed Web information (second Web information) with a high relevance to the analyzed Web information (first Web information), which has been transmitted together with the substitute area presentation request, is transmitted from the server 14.

The recording module 14 records Web information of Web pages which are displayed on the Web information integration screen, or analyzed Web information which defines the Web information integration screen.

In the meantime, it is assumed that each of the video display apparatuses 10-2, . . . , 10-n includes the same function as the above-described video display apparatus 10-1, and a detailed description thereof is omitted. In the above description, the apparatus main body 20 is controlled by operating the remote-controller 23. Alternatively, the apparatus main body 20 may be controlled by operating buttons (not shown), etc., which are provided on the apparatus main body 20.

As shown in FIG. 1, the server 14 includes a network I/F module 50, a substitute area presentation module 51 (similarity detection module 51a, relevance determination module 51b), a Web information analysis module 52 and a recording module 53.

The network I/F module 50 is an interface for transmitting/receiving data to/from an external device (e.g. video display apparatus 10, Web server, etc.) via the Internet 12. The network I/F module 50 transmits/receives analyzed Web information to/from the video display apparatuses 10-1, 10-2, . . . , 10-n. In addition, the network I/F module 50 can acquire a Web page (Web information which defines the structure of a page) from a Web site (not shown) which is opened on the Internet 12.

When the substitute area presentation module 51 has received the presentation request for a substitute area, together with the analyzed Web information (first Web information), from the video display apparatus 10 via the network I/F module 50, the substitute area presentation module 51 determines, from plural pieces of analyzed Web information recorded in the recording module 53, analyzed Web information (second Web information) with a high relevance to the analyzed Web information received from the video display apparatus 10 that is the source of the presentation request for a substitute area, and transmits the determined analyzed Web information. The substitute area presentation module 51 includes a similarity detection module 51a and a relevance determination module 51b. The similarity detection module 51a finds a degree of relevance, based on the data defined in the analyzed Web information. The relevance determination module 51b determines the analyzed Web information which is to be transmitted to the video display apparatus 10 that is the source of the presentation request, based on the degree of relevance that was found by the similarity detection module 51a.

The Web information analysis module 52 records in the recording module 53 the analyzed Web information which has been transmitted from the video display apparatus 10 via the network I/F module 50. In addition, based on the analyzed Web information received from the video display apparatus 10, the Web information analysis module 52 acquires via the network I/F module 50 the Web information of the Web page that is the target of display in the video display apparatus 10, analyzes this Web information, and generates structure information of the Web page (page corresponding to the partial area) that is the target of display. The structure information of the Web page is indicative of the characteristics of the page information which is displayed in the partial area (clip area) that is set in the video display apparatus 10, and the structure information of the Web page is used in order to determine the relevance of the analyzed Web information. Hereinafter, in some cases, the structure information of the Web page is referred to as vector information. The Web information analysis module 52 records the analysis result (vector information) of the Web information, together with the analyzed Web information, in the recording module 53.

The recording module 53 records analyzed Web information which is received from the plural video display apparatuses 10, and analysis results by the Web information analysis module 52. The video display apparatus 10 transmits analyzed Web information to the server 14, for example, at regular intervals, or transmits, when analyzed Web information has been corrected because of an alteration in the Web page that is the target of display, the corrected analyzed Web information to the server 14. The server 14 successively records the analyzed Web information pieces, which are received from the video display apparatuses 10, in association with the individual video display apparatuses 10, thereby managing the history of analyzed Web information.

Next, a description is given of the operation of the video display system (video display apparatus 10, server 14) in the embodiment.

To begin with, referring to a flow chart of FIG. 2, a Web information integration screen generation process by the video display apparatus 10 (video display apparatus 10-1 by way of example) is described.

When display of a Web page is instructed from the remote-controller 23 by a user operation, the video display apparatus 10 receives Web information by accessing via the network I/F module 25 a Web page which is made public on the Internet 12 (block A1). The Web information integration screen generation module 37 creates a Web screen, based on the analysis result of the Web information by the Web information analysis module 36, and causes the display 21 to display the Web page via the Web information integration screen output module 38. In this case, a Web page may be designated from pre-registered candidates, or an arbitrary URL may be designated by the user to designate a Web page.

Next, on the Web page displayed on the display 21, a partial area (clip area) that is the target of display on the Web information integration screen is designated by a user operation. The Web information integration screen generation module 37 selects the range, which has been designated on the Web page, as the clip area.

Figure 3:
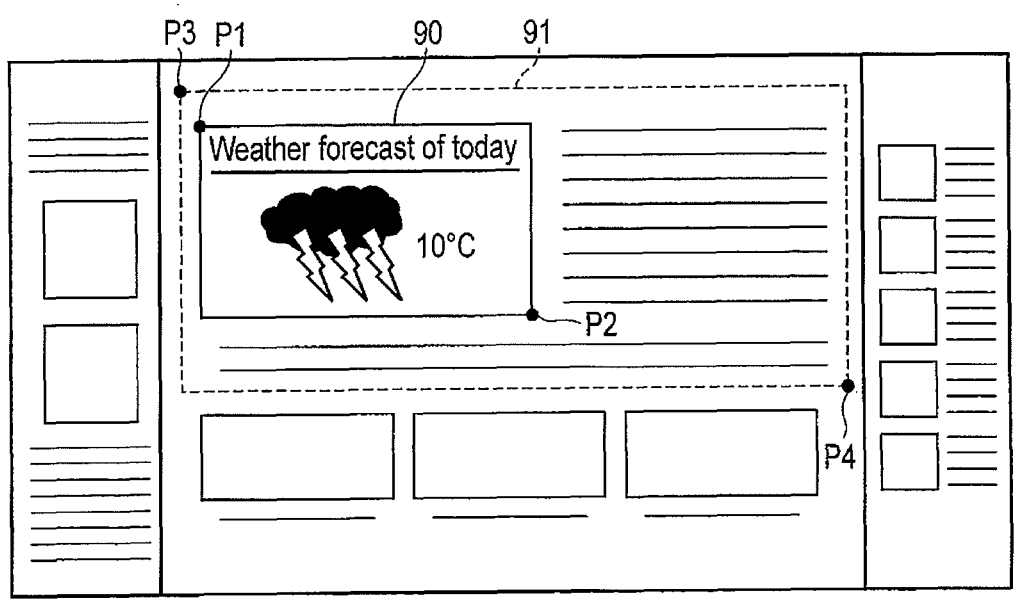
FIG. 3 is an exemplary view showing a screen of a display in the embodiment, on which a Web page is displayed.

FIG. 3 shows an example of the screen of the display 21, on which the Web page is displayed. The clip area may be designated, for example, in units of a content from a plurality of contents (image, text, etc.) arranged on the Web page. Alternatively, a pointer, which moves by a predetermined unit (e.g. in units of a predetermined number of pixels) on the screen in accordance with the operation of the remote-controller 23, may be displayed, and positions (e.g. an upper left apex and a lower right apex of a rectangle), which are indicative of the clip area, may be designated by the pointer.

FIG. 3 shows an example in which an area 90 has been designated on a content-by-content basis. The range of the area 90 can be specified by points P1 and P2. The area 90 displays, for example, an image relating to a weather forecast. An area of a content unit can be determined from the description of an HTML file which defines the structure of the Web page. On the other hand, an area 91 is an example of an area, the position of which is designated by the pointer. The range of the area 91 can be specified by an upper left apex P3 and a lower right apex P4 of a rectangle which is designated by the pointer. The area 91 displays an image and text.

Next, a position on the Web information integration screen, at which the Web page of the clip area is to be pasted (displayed), is designated by the user operation. The Web information integration screen generation module 37 determines the position, which is designated on the Web information integration screen, to be the paste position (block A3). The Web information integration screen generation module 37 inputs the analysis result of the Web information of the clip area by the Web information analysis module 36 (block A4), generates analyzed Web information defining the Web information integration screen, based on this analysis result and the paste position designated on the Web information integration screen, and records the analyzed Web information in the recording module 41 (block A5). The details of the analyzed Web information will be described later (FIG. 6, FIG. 7).

If the analyzed Web information is recorded in the recording module 41 by the Web information integration screen generation module 37, the analyzed Web information transmission module 39 transmits this analyzed Web information to the server 14 (block A6).

Figure 4:
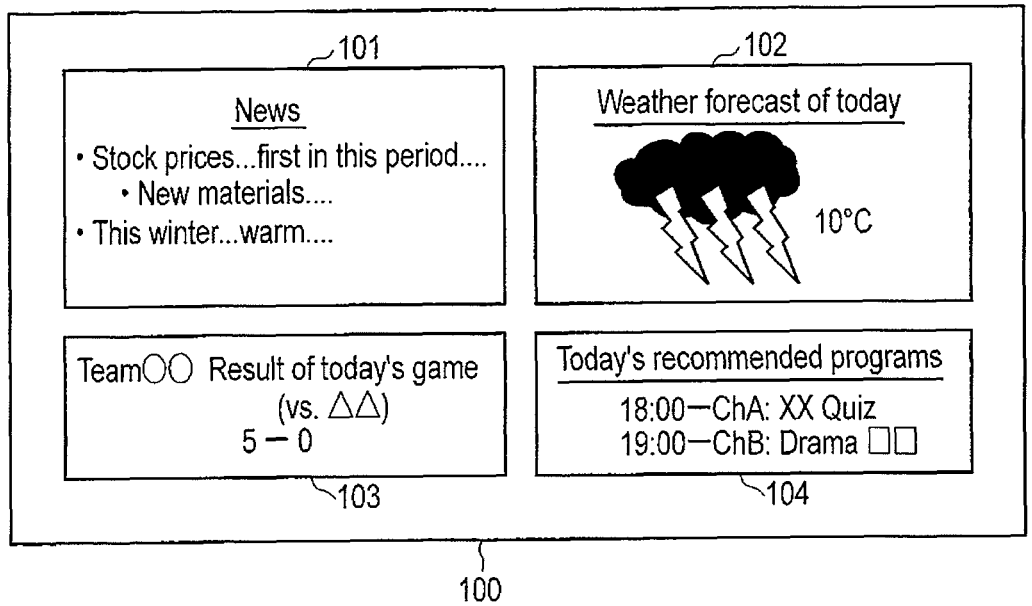
FIG. 4 is an exemplary view showing a Web information integration screen in the embodiment.

FIG. 4 shows an example of a Web information integration screen 100. In the example of the Web information integration screen 100 shown in FIG. 4, paste positions are set in two columns in the vertical direction. FIG. 4 shows paste positions 101, 102, 103 and 104 which are set for clip areas designated by four Web pages. For example, the paste position 102 is designated in accordance with the area 90 shown in FIG. 3. The page information (content) displayed in the area 90 is displayed at the paste position 102.

In the Web information integration screen, paste positions may not only be set in two columns in the vertical direction, as shown in FIG. 4, but may also be set at arbitrary positions or with arbitrary sizes by the designation by the user. In addition, the video display apparatus 10 may create a plurality of Web information integration screens, and may record analyzed Web information pieces corresponding to the respective Web information integration screens.

Figure 5:
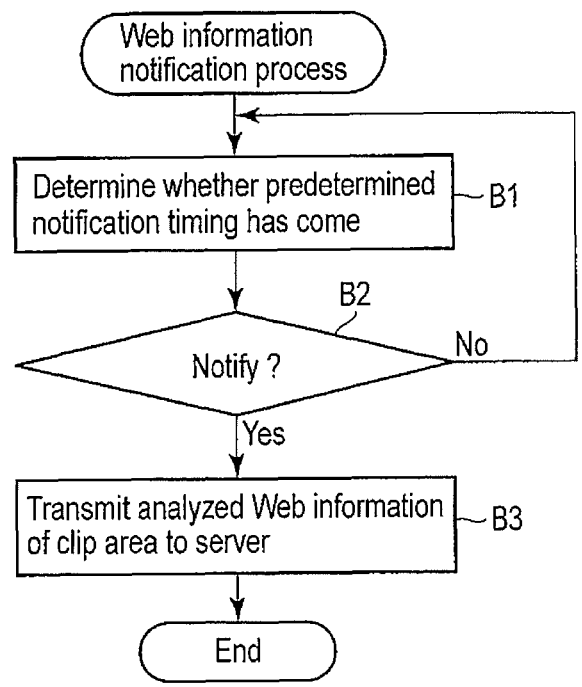
FIG. 5 is an exemplary flow chart illustrating a Web information transmission process by the video display apparatus in the embodiment.

Next, referring to a flow chart of FIG. 5, a Web information transmission process by the video display apparatus 10 is described.

The analyzed Web information reception module 40 does not only transmit the analyzed Web information to the server 14, when the analyzed Web information has been created or the analyzed Web information has been corrected, as described above. However, the analyzed Web information reception module 40 can also transmit to the server 14 the analyzed Web information recorded in the recording module 41 at regular intervals, for example, in every predetermined period.

When it is determined that a predetermined transmission timing has come (Yes in block B2), the analyzed Web information recorded in the recording module 41 is transmitted to the server 14 (block B3).

Thereby, when analyzed Web information has been generated in order to display a part of a Web page, which is provided by a certain Web site, on the Web information integration screen, the video display apparatus 10 can record in the server 14 the analyzed Web information including the information relating to the clip area which is determined on the Web page. Similarly, the other video display apparatuses 10-2, . . . , 10-n record the analyzed Web information which was generated therein. It is thus possible that, for example, the analyzed Web information, which is transmitted from the video display apparatus 10-1 that is used by a user A, and the analyzed Web information, which is transmitted from the video display apparatus 10-2 that is used by a user B, are defined such that a substantially identical range of the same Web page is clipped and displayed on the Web information integration screen. In the present embodiment, when two analyzed Web information pieces are defined in the same manner, it is determined that the two analyzed Web information pieces have a relevance. For example, when the analyzed Web information is corrected by the user B, the analyzed Web information corrected by the user B is provided in response to a substitute area presentation request from the user A. Thereby, it is unnecessary for the user A to perform a work of correcting the analyzed Web information.

FIG. 6 and FIG. 7 show examples of analyzed Web information recorded in the server 14. FIG. 6 shows analyzed Web information received from the video display apparatus 10-1 of the user A, and FIG. 7 shows analyzed Web information received from the video display apparatus 10-2 of the user B. However, data A4 shown in FIG. 6 and data B5 shown in FIG. 7 are vector information and are generated by the Web information analysis module 52 of the server 14.

In FIG. 6, "user_A_data" is a sequence of data (identified by id; b01, b02) of a plurality of Web information integration screens (boards), and the data of respective boards include information for displaying Web pages of a plurality of clip areas.

Next, main data which is set in "user_A_data" is explained. In data A1 in FIG. 6, "'id':'b01'" is identification information (ID) of the board, and indicates the data of a first Web information integration screen. In addition, data A1 includes "version", "design" (template name) and "name" (name given to the board), which are set with respect to the board.

Data A2, A3 and A4 are data relating to a Web page of one clip area which is displayed on the Web information integration screen. Data A2, A3 and A4 are data each relating to a Web page of one clip area, and include data similar to data A2, A3 and A4. Specifically, it is indicated that four Web pages are displayed on the Web information integration screen (board) which is identified by "'id':'b01'".

Data A2 in FIG. 6 includes data which identifies a clip area. In data A2, "'url':'http://baseball.example.com/npb/',' indicates an address (URL) of the Web page; "'id': "Too1113015311140028__102Base'" indicates identification information (ID) which is added to the clip area; "'date': "2011-03-31T00:29:53.050Z'" indicates a time when the clip area was created; "'title':'foo!sports-pro baseball'" indicates a title which is set in units of a clip area (e.g. a title is automatically acquired from the Web page indicated by URL); "'posi_top':70' is a Y coordinate indicating a paste position in the Web information integration screen (board) on which the page information of the clip area is displayed; and "'posi_left':100' is an X coordinate indicating a paste position in the Web information integration screen (board) on which the page information of the clip area is displayed.

Data A3 in FIG. 6 includes various parameters relating to the clip area. In data A3, "'zoom':1.22' is an enlargement ratio for displaying the page information of the clip area designated on the Web page in accordance with the paste position (range) on the Web information integration screen; "'width':634' is a pixel value of the width of the clip area; "'height':232' is a pixel value of the height of the clip area; "'selector':['#NpbBoxTeam']' is a list (e.g. selector of CSS, tag of HTML, XPath) of structure information in HTML for specifying the clip area; "'doc_height':7964' is a pixel number in width at a time when the page information of the clip area is displayed in accordance with the enlargement ratio; "'doc_width':2064' is a pixel value in height at a time when the page information of the clip area is displayed in accordance with the enlargement ratio; "'top':1147' is a y coordinate indicating a starting point (upper left apex of the rectangle) of the clip area at a time when the Web page indicated by the URL is displayed in accordance with the enlargement ratio; and "'left':784' is an x coordinate indicating a starting point (upper left apex of the rectangle) of the clip area at a time when the Web page indicated by the URL is displayed in accordance with the enlargement ratio.

Data A4 in FIG. 6 is vector information indicative of the characteristics of the page information corresponding to the clip area of the Web page indicated by the URL. The vector information is generated by the Web information analysis module 52 analyzing the Web information of the associated Web page. The vector information is received from the video display apparatus 10 and added to the analyzed Web information. The vector information is generated, for example, by using the information of the tag included in the HTML which defines the structure of the Web page. For example, the definition of "% block" in the standard of "HTML4" is used in the information of the tag which is used for structuring the vector information. The definition of "% block" is "|P % heading; |% list;  |%  preformatted; |DL|DIV|NOSCRIPT|BLOCKQUOTE|FORM|HR| TABLE|FIELDSET|ADDRESS".

Specifically, the vector information is generated by using the following tags: "P", "h1", "h2", "h3", "h4", "h5", "h6", "ul", "ol", "dir", "menu", "pre", "dl", "div", "center", "noscript", "noframes", "blockquote", "form", "isindex", "hr", "table", "fieldset" and "address".

In this case, the vector information is generated, for example, by simply counting the number of occurrences of the above-described tags and arranging them. For example, when there is an HTML file as shown in FIG. 8, if the clip area is an area of 'class="news2"', the vector information is "BlockVector=(div:1, h2:1, text:13)". This represents that tag "div" occurs once, tag "h2" occurs once, and there are 13 characters of text. In this manner, by using the vector information expressing, with simple numerical values, the structure of the Web page defined by HTML, it becomes possible to execute a similarity calculation (e.g. cosine similarity) using the vector information. Therefore, the relevance of the clip area can easily be discriminated, based on the similarly value.

In FIG. 6, in data A8 and A9, analyzed Web information of a second Web information integration screen (board), to which identification information "'id':'b02'" is added, is set. A detailed description thereof is omitted.

FIG. 7 shows analyzed Web information which is received from the video display apparatus 10-2 of the user B. The analyzed Web information shown in FIG. 7 includes a structure similar to that of the analyzed Web information shown in FIG. 6, so a detailed description is omitted.

Data B2, B3 and B4 in FIG. 7 indicate data generated in connection with a clip area which is set on the same Web page as the Web page corresponding to the data A2, A3 and A4 shown in FIG. 6. Specifically, the data B2, B3 and B4 and the data A2, A3 and A4 have a high relevance.

Next, referring to a flow chart of FIG. 9, a description is given of a Web information recording process by the server 14.

When the Web information analysis module 52 of the server 14 has received analyzed Web information from the video display apparatus 10 via the network I/F module 50 (block C1), the Web information analysis module 52 determines whether the analyzed Web information is new information or not. Specifically, the Web information analysis module 52 determines whether the analyzed Web information is analyzed Web information which has been generated by the setting of a new Web information integration screen. The Web information analysis module 52 determines whether the analyzed Web information is new analyzed Web information, for example, based on identification information or other data defined in the analyzed Web information.

When it is determined that the analyzed Web information is not new analyzed Web information (No in block C2), the Web information analysis module 52 determines whether there is an alteration in the analyzed Web information (block C6). The Web information analysis module 52 determines whether there is an alteration or not, for example, based on the identification information (ID) added to the clip area or the time of creation of the clip area, which are included in the analyzed Web information.

When there is no alteration in the analyzed Web information (No in block C7), the Web information analysis module 52 does not record the analyzed Web information which has been received from the video display apparatus 10. Specifically, the Web information analysis module 52 determines that the received analyzed Web information is analyzed Web information which has been transmitted by the video display apparatus 10 at regular intervals, and that no correction, etc. has been made in the Web information integration screen. Incidentally, the Web information analysis module 52 may simply record in the recording module 53 all analyzed Web information pieces which have been received from the video display apparatus 10.

On the other hand, When there is an alteration in the analyzed Web information (Yes in block C7), the Web information analysis module 52 records in the recording module 53 the altered analyzed Web information which has been received from the video display apparatus 10 (block C8). The analyzed Web information is recorded in the recording module 53 in association with each of the video display apparatuses 10.

For example, in the video display apparatus 10, when a Web page has been displayed on the Web information integration screen in accordance with an instruction from the user, it is assumed that the page information is not correctly displayed at a paste position which is set on the Web information integration screen. For example, when the layout of contents in a Web page has been altered or the content the Web page has been altered in the Web site, it is possible that a positional error occurs between the position of the clip area designated on the Web page and the position of the content that is the target of display. Besides, when the address (URL) of the Web page has been changed, even if the URL that is set in the analyzed Web information is accessed, the page information of the necessary Web page cannot be acquired.

In such a case, for example, by the same procedure as in the Web information integration screen generation process illustrated in the flow chart of FIG. 2, the re-setting of the clip area, which has failed to be correctly displayed, is executed. When the Web information analysis module 52 has received the analyzed Web information which has been altered by the re-setting, the Web information analysis module 52 records this altered analyzed Web information in the recording module 53. Since the analyzed Web information is recorded in the recording module 53 as the history in association with each of the video display apparatuses 10, the alteration of the analyzed Web information can be discriminated.

In the meantime, when new analyzed Web information has been received from the video display apparatus 10, the substitute area presentation module 51 determines a relevance between the new analyzed Web information and the existing analyzed Web information which is recorded in the recording module 53 and received from other video display apparatuses 10 (block C3). Specifically, the substitute area presentation module 51 determines whether analyzed Web information, which sets the clip area at the same position on the same Web page, has already been generated by other video display apparatuses 10.

Figure 10:
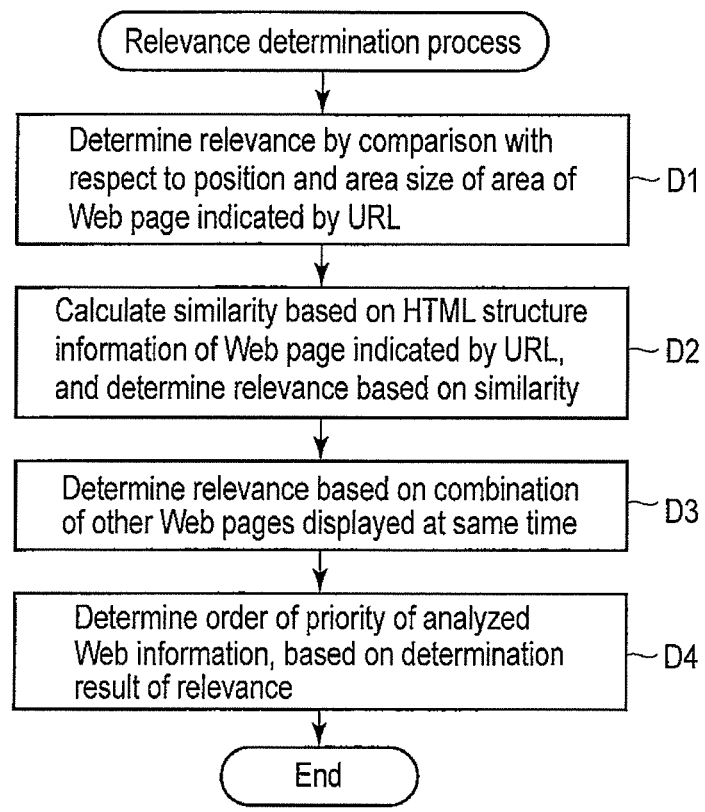
FIG. 10 is an exemplary flow chart illustrating a relevance determination process by a substitute area presenting module in the embodiment.

FIG. 10 is a flow chart illustrating a relevance determination process by the substitute area presentation module 51.

The similarity detection module 51a of the substitute area presentation module 51 determines a relevance between two analyzed Web information pieces with respect to each of clip areas, based on the data included in the analyzed Web information.

Specifically, the similarity detection module 51a determines the relevance by comparison of each of the position and area size of the clip area of the Web page indicated by the URL (block D1). The similarity detection module 51a compares the numbers of pixels of the clip areas, based on the parameters (data A3 shown in FIG. 6, data B4 shown in FIG. 7) relating to the clip areas recorded in the analyzed Web information. If the difference between the numbers of pixels is within a range of a predetermined threshold, it can be determined that the relevance is high. The threshold can arbitrarily be set in the server 14.

In addition, the similarity detection module 51a calculates a similarity based on the HTML structure information (vector information) of the Web page indicated by the URL, and determines the relevance, based on this similarity (block D2).

The similarity detection module 51a calculates, for example, a cosine similarity, based on the vector information (data A4 shown in FIG. 6, data B5 shown in FIG. 7) of the analyzed Web information. By calculating the cosine similarity with respect to the vector information, the similarity based on the presence/absence of tags of HTML can be calculated. The cosine similarity indicates that the similarity is higher as the value of the cosine similarity becomes closer to "1". When the cosine similarity is a predetermined threshold or more, it can be determined that the relevance is high.

In addition, the similarity detection module 51a determines the relevance, based on the combination of Web pages (clip areas) which are displayed at the same time on the Web information integration screen (block D3). For example, FIG. 11 shows an example of the Web information integration screen which is set in the video display apparatus 10 of the user B, and FIG. 12 shows an example of the Web information integration screen which is set in the video display apparatus 10 of the user A. The analyzed Web information, which has been received from the video display apparatus 10 of the user B, includes data for displaying page information of clip areas which are designated as five Web pages (URL AAA, URL BBB, URL CCC, URL ODD, and URL XXX). On the other hand, the analyzed Web information, which has been received from the video display apparatus 10 of the user A, also includes data for displaying page information of the same five Web pages. Thus, when attention is paid to the clip area that is designated as the Web page of "URL XXX", since the Web pages which are to be displayed at the same time on the Web information integration screen are the same, it can be determined that the relevance is high.

Based on the determination result of relevance by the similarity detection module 51a, the relevance determination module 51b determines the order of priority of analyzed Web information pieces having a high relevance (block D4). In this case, with respect to each of clip areas included in the analyzed Web information, the order of priority of other clip areas, which have been determined to have a high relevance, is determined.

FIG. 13 shows clip areas in the order of high relevance, which are determined, for example, with respect to the clip area of the first Web information integration screen (board) which is set in the analyzed Web information of the user A.

In FIG. 13, "candidate_area" indicates the level of relevance based on the area size; "candidate_position" indicates the level of relevance based on the position; "candidate_similarity" indicates the level of relevance based on the similarity calculated based on the vector information; and "candidate_url" indicates the level of relevance based on peripheral clip areas (URL) which are displayed at the same time on the Web information integration screen. The relevance is higher as the value of the relevance becomes closer to "1".

If the relevance determination process is completed, the substitute area presentation module 51 records the relevance of the analyzed Web information in the recording module 53, based on the result of this process (block C4). Specifically, with respect to each unique data (e.g. user name, id of the board, id of the enlarged display area) which identifies the clip area, the substitute area presentation module 51 records the data indicative of the correspondence to at least one of clip areas of the high priority order, which have been determined to have high relevance.

For example, in the examples of the analyzed Web information shown in FIG. 6 and FIG. 7, the data, which indicates high relevance between the clip area corresponding to data A2 to a4 shown in FIG. 6 and the clip area corresponding to data B3 to B5 shown in FIG. 7, is recorded.

In the process illustrated in the flow chart of FIG. 9, the relevance of the new analyzed Web information to the existing analyzed Web information is determined. However, with respect to the analyzed Web information which has been determined to include an alteration in block C6, the relevance of this analyzed Web information to the existing analyzed Web may be determined in the same manner as described above.

The relevance determination process (block C3) is executed when new analyzed Web information has been received. However, after the analyzed Web information is recorded in the recording module 53, the relevance determination process may be executed at an arbitrary timing. In this case, the relevance determination process can be executed at a time with respect to a plurality of analyzed Web information pieces.

Besides, in the relevance determination process, the priority may be set on the processes which are executed in blocks D1, D2 and D3, and the processes may be executed in the order of priority. In this case, candidates of plural analyzed Web information pieces are narrowed down by the process with the highest priority, and the process with the second highest priority is executed on the narrowed-down candidates of analyzed Web information pieces. Meanwhile, all processes of blocks D1, D2 and D3 may not be executed, and any one of these processes or a combination of arbitrary two of these processes may be executed.

Next, referring to a flow chart of FIG. 14, a description is given of a substitute area request process in the video display apparatus 10. In addition, referring to a flow chart of FIG. 15, a description is given of a substitute area presentation process in the server 14.

For example, it is assumed that when a Web information integration screen is displayed in the video display apparatus 10-2 that is used by the user B, there is a clip area (e.g. a clip area corresponding to data B3 to B5 in FIG. 7) in which page information is not correctly displayed. If the clip area is corrected by the operation of the user B so as to correctly display the page information, the altered analyzed Web information is transmitted to the server 14.

On the other hand, it is assumed that when a Web information integration screen is displayed in the video display apparatus 10-1 that is used by the user A, there is a clip area (e.g. a clip area corresponding to data A2 to A4 in FIG. 6) in which page information is not correctly displayed. The user A designates the page information (clip area) which is not correctly displayed on the Web information integration screen, by operating the remote-controller 23, and instructs execution of a presentation request for a substitute area.

If the designation of the page information (clip area) that is the target of correction is input (block F1), the analyzed Web information transmission module 39 transmits to the server 14 the analyzed Web information including this clip area, together with the presentation request for a substitute area (block F2). It is assumed that data which specifies the clip area that is the target of correction (substitution) has been added.

If the substitute area presentation module 51 of the server 14 receives the presentation request for a substitute area (block E1), the substitute area presentation module 51 determines the analyzed Web information including a clip area having a high relevance to the clip area that is the target of substitution, based on the data recorded in block C4 of the Web information recording process (block E2). The analyzed Web information, which is determined here, is the information before the correction of the clip area by the user B.

The substitute area presentation module 51 detects, from the recording module 53, the latest analyzed Web information after alteration, which corresponds to the analyzed Web information determined in block E2 (block E3). Specifically, the substitute area presentation module 51 detects the altered analyzed Web information which has been received from the video display apparatus 10-2 because of the correction of the clip area by the user B.

Then, the substitute area presentation module 51 transmits the latest analyzed Web information (clip area) as a substitute area to the video display apparatus 10-1 (block E4).

If the video display apparatus 10-1 receives the analyzed Web information which has been transmitted from the server 14 in response to the presentation request for a substitute area (Yes in block F3), the video display apparatus 10-1 alters the data of the associated clip area of the original analyzed Web information, based on the data of the substitute area (clip area) included in the received analyzed Web information (block F4).

Thus, simply by designating the area that is the target of correction and instructing the presentation request for a substitute area, the video display apparatus 10-1 can alter the analyzed Web information, based on the data corrected by the user B in the video display apparatus 10-2.

In the meantime, when the page information, which is displayed after the alteration by the presentation request for a substitute area, is not in an unintended state, the presentation request for a substitute area can be transmitted once gain. In the Web information recording process (block C4), when the data indicating the correspondence of clip areas with high relevance is recorded, the substitute area presentation module 51 notifies the substitute area in the same manner as described above, with respect to the analyzed Web information including the clip area having the next highest priority.

In this manner, as regards the display of the clip area of the Web page that is the target of display on the Web information integration screen, the area of the substitute part with high relevance is presented, based on the relevance or history of a plurality of pieces of analyzed Web information recorded in the server 14. Thus, even when the page information that is displayed on the Web information integration screen fails to be correctly displayed, the user can easily make correction without manually performing a correction operation of the clip area of the Web page. Therefore, the load on the user can greatly be reduced.

In the above description, the analyzed Web information, which is transmitted from the plural video display apparatuses 10-1, 10-2, . . . , 10-n, is recorded in the server 14, and the substitute area is presented based on the relevance of the analyzed Web information (clip area). However, a video display system without the provision of the server 14 can be realized.

Figure 16:
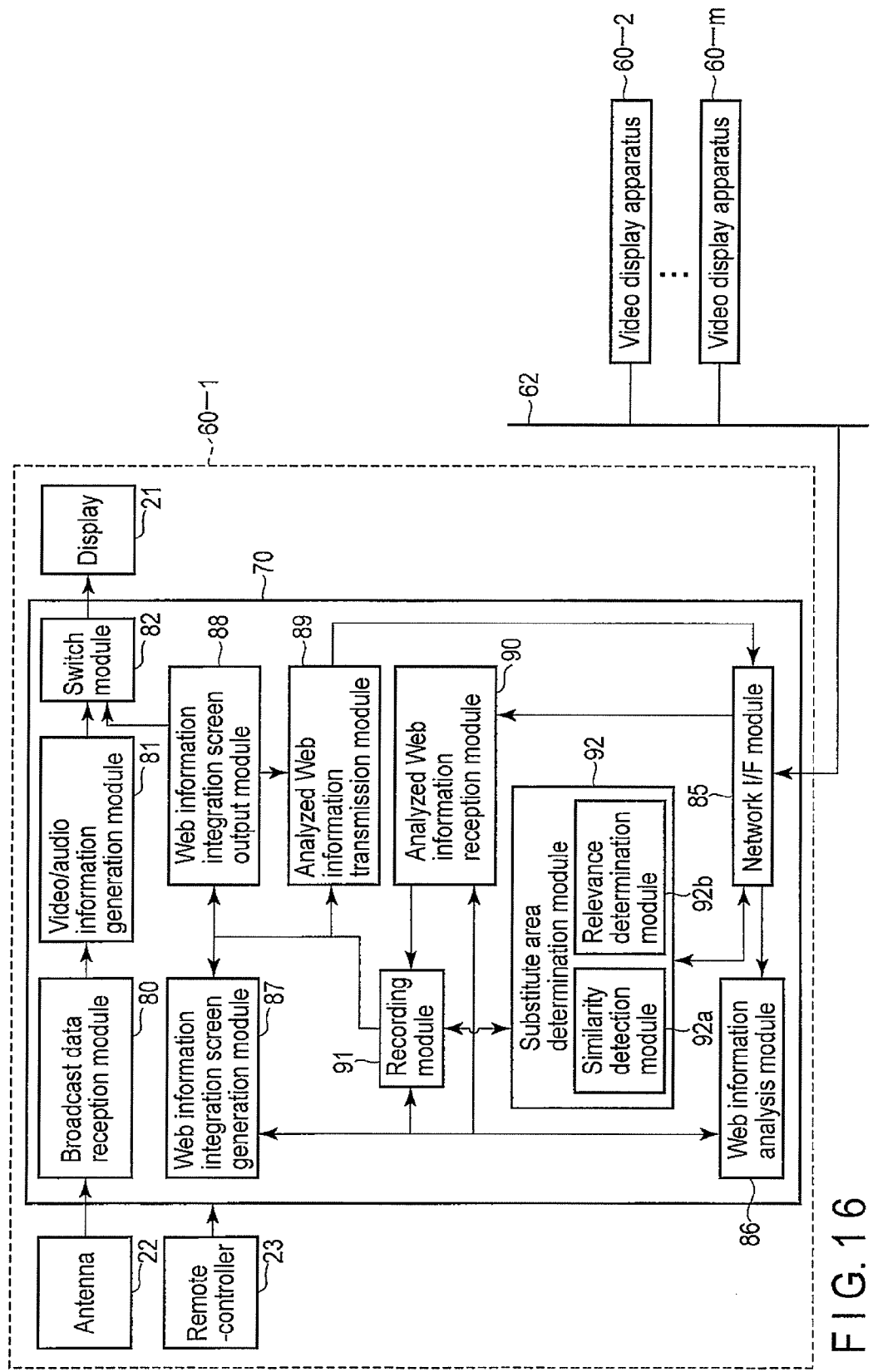
FIG. 16 is an exemplary block diagram showing a video display system in the embodiment, in which a plurality of video display apparatuses are connected over a LAN.

FIG. 16 is a block diagram showing an example of a video display system in which a plurality of video display apparatuses 60-1, 60-2, . . . , 60-m are connected via, e.g. a LAN (Local Area Network) 62. For example, the case is assumed in which the plural video display apparatuses 60-1, 60-2, . . . , 60-m are used in the home.

As shown in FIG. 16, the video display apparatus 60-1 is provided with a substitute area determination module 92. The substitute area determination module 92 includes a similarity detection module 92a and a relevance determination module 92b. It is assumed that the other functional modules execute the same processes as the functional modules indicated by the same names in FIG. 1, and a detailed description thereof is omitted. However, it is assumed that a Web information analysis module 86 includes the same function (generation of vector information) as the Web information analysis module 52 of the server 14 shown in FIG. 1. The video display apparatuses 60-2, . . . , 60-m have the same functions and execute the same processes as the video display apparatus 60-1.

The substitute area determination module 92 determines a relevance between analyzed Web information, which is received from other video display apparatuses 60, and analyzed Web information recorded in the own apparatus. When the data of a clip area included in the analyzed Web information with high relevance has been altered, the substitute area determination module 92 corrects, based on this data, the data of the clip area of the analyzed Web information recorded in the own apparatus.

It is assumed that the video display apparatuses 60-1, 60-2, . . . , 60-m are set to be usable in the same environment, and the same setting is executed with respect to the Web information integration screen. In the video display apparatuses 60-1, 60-2, . . . , 60-m, when an operation of setting the Web information integration screen has been executed, the analyzed Web information is transmitted to the other video display apparatus.

For example, it is assumed that when the Web information integration screen was displayed in the video display apparatus 60-2, the Web information integration screen failed to be correctly displayed and a correction operation was performed in the video display apparatus 60-2. In this case, the altered analyzed Web information is transmitted to the video display apparatus 60-1. The substitute area determination module 92 of the video display apparatus 60-1 corrects the analyzed Web information for the own apparatus, based on the analyzed Web information (the data of the clip area) which has been received from the video display apparatus 60-2.

Thereby, in the video display apparatuses 60-1, . . . , 60-m, there is no need to perform a correction work of the Web information integration screen (clip area). Therefore, without requiring a work load on the user, the Web information integration screen can be displayed in the same environment.

In FIG. 16, the video display apparatuses 60-1, 60-2, . . . , 60-m have been described as executing the same processes. However, for example, one video display apparatus 60-1 may be configured to function in the same manner as the server 14 shown in FIG. 1, and a substitute area may be presented from the video display apparatuses 60-1 to the other video display apparatuses 60-2, ..., 60-*m*.

The processes that have been described in connection with the present embodiment may be stored as a computer-executable program in a recording medium such as a magnetic disk (e.g. a flexible disk, a hard disk), an optical disk (e.g. a CD-ROM, a DVD) or a semiconductor memory, and may be provided to various apparatuses. The program may be transmitted via communication media and provided to various apparatuses. An electronic apparatus, in which the functions of the computer are implemented, reads the program that is stored in the recording medium or receives the program via the communication media. The operation of the apparatus is controlled by the program, thereby executing the above-described processes.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A first electronic apparatus comprising:
   a processor device configured to select a first clip area of a first Web page at a first time period before the first Web page is updated, the first clip area including a first content that comprises dynamic information, the processor device further configured to display the first content on a display of the first electronic apparatus;
   a transmitter configured to transmit a first Web information to an external apparatus, wherein the first Web information corresponds to the first clip area and comprises Web page structure information; and
   a receiver configured to receive a third Web information from the external apparatus, wherein third Web information corresponds to an updated second Web information selected during a second time period, the second Web information corresponds to a second clip area of the first Web page selected in a second electronic apparatus during the first time period, the second clip area includes the first content, the second time period being after the first web page has updated,
   wherein the processor device is further configured to display an updated version of the first content based on the third Web information, and
   the second Web information has a relevance to the first Web information, wherein the relevance is determined by using at least one of (1) a position of the first clip area and the second clip area, (2) a size of the first clip area and the second clip area, (3) the number of pixels of the first clip area and the second clip area, or (4) Web page structure information of the first clip area and second clip area.

2. The apparatus of claim 1, wherein Web page structure information includes HTML tags.

3. The apparatus of claim 1, wherein the relevance is determined by using a position of the first clip area and the second clip area.

4. The apparatus of claim 1, wherein the relevance is determined by using a size of the first clip area and the second clip area.

5. The apparatus of claim 1, wherein the relevance is determined by using the number of pixels of the first clip area and the second clip area.

6. The apparatus of claim 1, wherein the relevance is determined by using Web page structure information of the first clip area and second clip area.

7. A method of controlling a first electronic apparatus, comprising:
   selecting, by a processor device of the first electronic apparatus, a first clip area of a first Web page displayed by the first electronic apparatus at a first time period before the first Web page is updated, the first clip area including a first content that comprises dynamic information;
   displaying the first content on a display of the first electronic apparatus;
   transmitting a first Web information to an external apparatus, wherein the first Web information corresponds to the first clip area and comprises Web page structure information;
   receiving a third Web information from the external apparatus, wherein third Web information corresponds to an updated second Web information selected during a second time period, the second Web information corresponds to a second clip area of the first Web page selected in a second electronic apparatus during the first time period, the second clip area includes the first content, the second time period being after the first web page has updated; and
   displaying an updated version of the first content based on the third Web information,
   wherein the second Web information has a relevance to the first Web information wherein the relevance is determined by using at least one of (1) a position of the first clip area and the second clip area, (2) a size of the first clip area and the second clip area, (3) the number of pixels of the first clip area and the second clip area, or (4) Web page structure information of the first clip area and second clip area.

8. The method of claim 7, wherein Web page structure information includes HTML tags.

9. The method of claim 7, wherein the relevance is determined by using the position of the first clip area and the second clip area.

10. The method of claim 7, wherein the relevance is determined by using the size of the first clip area and the second clip area.

11. The method of claim 7, wherein the relevance is determined by using the number of pixels of the first clip area and the second clip area.

12. The method of claim 7, wherein the relevance is determined by using the Web page structure information of the first clip area and second clip area.

13. A non-transitory computer-readable storage medium, having stored instructions therein, wherein the instructions, when executed by a computer, cause the computer to perform:
   selecting a first clip area of a first Web page at a first time period before the first Web page is updated, the first clip area including a first content;

displaying the first content on a display;

transmitting a first Web information to an external apparatus, wherein the first Web information corresponds to the first clip area and comprises Web page structure information;

receiving a third Web information from the external apparatus, wherein third Web information corresponds to an updated second Web information selected during a second time period, the second Web information corresponds to a second clip area of the first Web page selected in a second electronic apparatus during the first time period, the second clip area includes the first content, the second time period being after the first web page has updated; and displaying an updated version of the first content based on the third Web information, wherein the second Web information has a relevance to the first Web information wherein the relevance is determined by using at least one of (1) a position of the first clip area and the second clip area, (2) a size of the first clip area and the second clip area, (3) the number of pixels of the first clip area and the second clip area, or (4) Web page structure information of the first clip area and second clip area.

14. The non-transitory computer-readable storage medium of claim 13, wherein Web page structure information includes HTML tags.

15. The non-transitory computer-readable storage medium of claim 13, wherein the relevance is determined by using a position of the first clip area and the second clip area.

16. The non-transitory computer-readable storage medium of claim 13, wherein the relevance is determined by using a size of the first clip area and the second clip area.

17. The non-transitory computer-readable storage medium of claim 13, wherein the relevance is determined by using the number of pixels of the first clip area and the second clip area.

18. The non-transitory computer-readable storage medium of claim 13, wherein the relevance is determined by using Web page structure information of the first clip area and second clip area.

* * * * *